United States Patent
Ledesma et al.

(10) Patent No.: US 8,442,707 B2
(45) Date of Patent: May 14, 2013

(54) IMPLEMENTING CONTINUOUS DESCENT APPROACHES FOR MAXIMUM PREDICTABILITY IN AIRCRAFT

(75) Inventors: Ramon Gomez Ledesma, Madrid (ES); David Garrido-Lopez, Madrid (ES)

(73) Assignee: The Boeing Company, Chicago, IL (US)

(*) Notice: Subject to any disclaimer, the term of this patent is extended or adjusted under 35 U.S.C. 154(b) by 556 days.

(21) Appl. No.: 12/704,274

(22) Filed: Feb. 11, 2010

(65) Prior Publication Data

US 2010/0217461 A1    Aug. 26, 2010

(30) Foreign Application Priority Data

Feb. 25, 2009    (EP) .................................. 09380031

(51) Int. Cl.
    *G05D 1/00*    (2006.01)
(52) U.S. Cl.
    USPC ........... 701/18; 701/3; 701/6; 701/10; 701/16
(58) Field of Classification Search ................. 701/3–18
    See application file for complete search history.

(56) References Cited

U.S. PATENT DOCUMENTS

| | | | | |
|---|---|---|---|---|
| 3,789,661 | A * | 2/1974 | Melsheimer | 73/178 T |
| 4,956,780 | A * | 9/1990 | Sankrithi et al. | 701/16 |
| 5,745,054 | A * | 4/1998 | Wilkens | 340/972 |
| 6,163,744 | A * | 12/2000 | Onken et al. | 701/3 |
| 6,282,466 | B1 * | 8/2001 | Nolte et al. | 701/11 |
| 6,389,333 | B1 * | 5/2002 | Hansman et al. | 701/3 |
| 2008/0133069 | A1 * | 6/2008 | Morales De La Rica et al. | 701/4 |
| 2009/0112535 | A1 * | 4/2009 | Phillips | 703/2 |
| 2010/0036551 | A1 * | 2/2010 | Lacaze et al. | 701/18 |
| 2010/0318244 | A1 * | 12/2010 | Gomez et al. | 701/3 |

FOREIGN PATENT DOCUMENTS

EP    1962256 A1 *  8/2008

OTHER PUBLICATIONS

Green et al., Field evaluation of descent advisor trajectory prediction accuracy for en-route clearance advisories, 1996, American Institute of Aeronautics and Astronautics.*
Ren et al., Workstation based fast-time aircraft simulator for noise abatement approach procedure study, 2004, AIAA.*
Ledesma et al., Continuous descent approaches for maximum predictability, 2007, IEEE.*

* cited by examiner

*Primary Examiner* — Thomas Black
*Assistant Examiner* — Sara Lewandroski
(74) *Attorney, Agent, or Firm* — Moore & Van Allen PLLC

(57) ABSTRACT

The present invention relates to continuous descent approaches that ensure the greatest certainty in arrival time. The continuous descent approach is flown by maintaining an aerodynamic flight path angle, thereby allowing a ground speed to be followed with greater accuracy. An improvement is described that accounts for turns made during continuous descent approaches that may otherwise cause a drift away from the desired ground speed, and hence arrival time. A correction to the aerodynamic flight path angle is used that produces a compensatory change in the potential energy of the aircraft upon completing the turn to balance the anticipated drift in kinetic energy.

15 Claims, 5 Drawing Sheets

IMPLEMENTING CONTINUOUS DESCENT APPROACHES FOR MAXIMUM PREDICTABILITY IN AIRCRAFT

CROSS REFERENCE TO RELATED APPLICATIONS

This application claims priority to European Patent Application No. 09380031.6 filed on Feb. 25, 2009, the contents of which are hereby incorporated by reference herein in its entirety.

FIELD OF THE INVENTION

The present invention relates to methods of calculating and flying continuous descent approaches to an airport or the like, and to aircraft navigation systems for implementing these methods.

BACKGROUND

Typically, aircraft will approach an airport under the guidance of air traffic controllers. The air traffic controllers are tasked with ensuring the safe arrival of aircraft at their destination, while also ensuring the capacity of the airport is maximised. The former requirement is generally met by ensuring minimum specified separations are maintained between aircraft.

Air traffic control is subject to uncertainties that may act to erode the separation between aircraft such as variable winds, both in speed and direction, and different piloting practices. Nonetheless, large numbers of aircraft can operate safely confined in a relatively small space since air traffic control can correct for these uncertainties at a tactical level using radar vectoring, velocity change and/or altitude change. As a result, a typical approach to an airport will involve a stepped approach where the aircraft is cleared to descend in steps to successively lower altitudes as other air traffic allows.

An alternative is to fly continuous descent approaches into airports, as this provides significant advantages. For example, air traffic noise around airports has important social, political and economical consequences for airport authorities, airlines and communities. Continuous descent approaches are an affordable way to tackle this noise problem as they reduce the number of aircraft that fly over sensitive areas at low altitude with high thrust settings and/or with non-clean aerodynamic configurations (e.g. with landing gear and/or flaps deployed). In contrast, conventional step-down approaches act to exacerbate this problem as aircraft are held at low altitudes, where engine thrust must be sufficient to maintain level flight. Continuous descent approaches also benefit fuel efficiency and minimise flight time.

However, continuous descent approaches create problems for air traffic control. The approaches must be planned in detail and then variations in the expected flight history (e.g. due to the prevailing wind conditions) cannot be subjected to tactical corrections to ensure safe aircraft separation like those used in conventional step-down approaches. Generally, this means air traffic controllers must impose larger separations between aircraft to guarantee that the aircraft arrive at the airport separated by a safe distance, bearing in mind the potential differences in aircraft separation as a result of wind changes and other uncertainties. Such an increase in separation results in an undesirable reduction in airport capacity.

European patent application number EP07380053.4, published as EP 1962256 A1 and commonly assigned, provides further background on continuous descent approaches, and describes a way of minimising uncertainties in the position and ground speed histories of aircraft flying continuous descent approaches such that greater certainty in arrival times is obtained. This allows air traffic controllers to safely reduce the separation between aircraft, thus satisfying the capacity needs of modern airports. This is achieved by maintaining a constant aerodynamic flight path angle while flying the continuous descent approach. This produces the lowest uncertainty in arrival time of aircraft, and offers a significant advantage over the previously favoured control law of maintaining a constant airspeed.

The aerodynamic flight path angle to be maintained may be chosen to produce the minimal variation in coefficient of lift. Put another way, an aerodynamic flight path angle may be determined that shows only minimal variation between the top and bottom of descent of the continuous descent approach. The optimum aerodynamic flight path angle is likely to vary for any particular aircraft type, and may even vary for different models within that type. Further parameters are also likely to affect the optimum aerodynamic flight path angle, such as the weight of the aircraft, the expected wind and wind gradient and the expected atmospheric conditions. The aerodynamic flight path angle to be maintained may be determined using a look-up table of data, or determined using simulations. This may be performed on the aircraft or at the airport. The airport may assign a common aerodynamic flight path angle to all aircraft types arriving at the airport, and may also assign a ground speed to be met at the top of descent.

The present disclosure aims to develop the methods described in EP07380053.4.

SUMMARY

Against this background and from a first aspect, the present disclosure resides in a method of flying a continuous descent approach in an aircraft, the continuous descent approach including a turn, the method comprising:
(a) adopting a predetermined aerodynamic flight path angle at the start of the continuous descent approach;
(b) flying the continuous descent approach while maintaining the predetermined aerodynamic flight path angle;
(c) calculating a correction to the predetermined aerodynamic flight path angle to compensate for drift in the actual ground speed from a desired ground speed history when making the turn; and
(d) making the turn while maintaining the corrected aerodynamic flight path angle;
(e) wherein the correction to the predetermined aerodynamic flight path angle compensates for drift in actual ground speed from a desired ground speed history when making the turn, and is calculated to produce a change in the potential energy of the aircraft upon completing the turn substantially to correct a kinetic energy error corresponding to the difference in the actual kinetic energy of the aircraft upon completing the turn from the desired kinetic energy.

It has been realised that the further improvements may be made to the methods proposed in EP07380053.4. In particular, improvements may be made when making turns during a continuous descent approach. EP07380053.4 proposes maintaining a constant aerodynamic flight path angle during the descent, and this works well in producing ground speed histories that are less sensitive to the effects of varying winds when flying the descent. It has been realised that while this works well when flying straight legs of the descent, differences between the actual wind vector and the nominal wind vector causes the aircraft's ground speed to drift when making turns. The effect is due to unexpected aircraft drift exerted by the surrounding air mass that cannot be felt directly by airspeed sensors. As a consequence, errors in the expected arrival time of the aircraft result.

To mitigate this problem, a correction is applied to the aerodynamic flight path angle followed during the continuous descent approach that may then be applied during the turn. This will result in the aircraft finishing the turn at an altered altitude relative to if the uncorrected aerodynamic flight path angle had been followed. The consequential change in potential energy may be used to balance the change in the kinetic energy caused by the drift in ground speed. For example, the ground speed error caused by the wind prediction error may be estimated. The corresponding kinetic energy error may then be determined, and a compensatory change in potential energy may then be introduced during the turn by applying a correction to the aerodynamic flight path angle maintained during the turn.

The above method may be implemented by a computer, for example a computer on an aircraft or a computer at an air traffic control facility.

The method may comprise adopting a predetermined ground speed at the start of the continuous descent approach. The predetermined ground speed may be chosen to produce the greatest predictability of the time to fly the continuous descent approach. This ground speed may be chosen by the pilot, or may be chosen by air traffic control and provided to the aircraft.

Calculating the required correction to the aerodynamic flight path angle for turns may be performed in any number of ways. Ultimately, what is sought is an assessment of the kinetic energy error caused by finishing the turn at a ground speed away from the desired ground speed, and then a calculation of the change in aerodynamic flight path angle that will bring about a commensurate change in potential energy.

Thus, the method may comprise assessing the kinetic energy error when calculating the correction to the predetermined aerodynamic flight path angle. This assessment may be performed directly, or as part of a larger calculation. For example, the method may comprise assessing the ground speed error corresponding to the difference in the actual ground speed of the aircraft upon completing the turn from the desired ground speed, and obtaining the kinetic energy error from the ground speed error. The kinetic energy error may be calculated by solving $\Delta E_T \approx m v_{GSf} \Delta v_{GS}$, where $\Delta E_T$ is the kinetic energy error, m is representative of the mass of the aircraft, $V_{GSf}$ is the desired ground speed of the aircraft at the end of the turn and $\Delta V_{GS}$ is the ground speed error. The change in the aerodynamic flight path angle may be calculated by solving $$\Delta \gamma = \frac{v_{GSf} \Delta v_{GS}}{g(s_f - s_i)},$$

where $\Delta \gamma$ is the change in aerodynamic flight path angle, $V_{GSf}$ is the desired ground speed of the aircraft at the end of the turn, $\Delta V_{GS}$ is the ground speed error, g is acceleration due to gravity, $s_f$ is the final altitude and $s_i$ is the initial altitude.

A more direct method may be used to calculate the change in aerodynamic flight path angle. The method may comprise calculating the change in the aerodynamic flight path angle by solving $$\Delta \gamma = -v_{GSf} \frac{\Delta w_x (\cos \chi_f - \cos \chi_i) + \Delta w_y (\sin \chi_f - \sin \chi_i)}{g |\chi_f - \chi_i| R_c},$$

where $\Delta \gamma$ is the change in aerodynamic flight path angle, $V_{GSf}$ is the desired ground speed of the aircraft at the end of the turn, $\Delta w_x$ is the difference in the predicted wind vector component in the true North-South direction from the actual wind vector component in the true North-South direction, $\Delta w_y$ is the difference in the predicted wind vector component in the true East-West direction from the actual wind vector component in the true East-West direction, $\chi_i$ is the initial true heading, $\chi_f$ is the final true heading, g is acceleration due to gravity, and $R_c$ is the radius of the turn. The adjective 'true' refers to true geographic components rather than magnetic components.

The values used in the above equations may be obtained in different ways. Some may be measured or derived from measurements made by the aircraft. For example, the wind speed vector is determined by most aircraft navigation systems with instrumental flight capabilities, and the components then calculated. Other values may be known from the flight plan of the approach, e.g. the headings, radius of the turn and final ground speed. These values are likely to be stored in memory and available to a computer or the like that is used to calculate the aerodynamic flight path angle correction.

Optionally, the method may comprise dividing the turn into segments and, for each segment, performing steps (c) and (d), in light of step (e), for that segment. The method may comprise determining whether the turn exceeds a threshold, and dividing the turn into segments only if the turn exceeds that threshold. For example, a threshold of 30° may be used. The size of the segments may be determined in many different ways. For example, segments may be created that are equal in size to the threshold value. Alternatively, the turn may be divided into equal segments: optionally, their size is as close as possible to the threshold size without exceeding the threshold size.

The method may comprise returning to the predetermined aerodynamic flight path angle upon completing the turn and maintaining the predetermined aerodynamic flight path angle while straight flight continues. The method may then also comprise making one or more further turns during the continuous descent approach, and repeating steps (c) and (d), in light of step (e), for each of the one or more turns. Thus, the advantages of the present disclosure are enjoyed for each turn.

From a second aspect, the present disclosure resides in a method of calculating a correction to an aerodynamic flight path angle of an aircraft when flying a continuous descent approach. The continuous descent approach is planned to maintain the aerodynamic flight path angle and to follow a desired ground speed history. The correction to the aerodynamic flight path angle compensates for drift in the actual ground speed from the desired ground speed history when making a turn during the continuous descent approach. This drift in ground speed will introduce a kinetic energy error corresponding to the difference in the actual kinetic energy of the aircraft upon completing the turn from the desired kinetic energy. The method comprises calculating a change in the aerodynamic flight path angle that will produce a change in the potential energy of the aircraft upon completing the turn substantially to correct the kinetic energy error. Thus, the present disclosure also extends to the method of calculating the correction, that may then be applied during flight. As before, the method may be implemented by a computer, for example on an aircraft or at an air traffic control facility. Many of the optional features described above with respect to the first aspect of the disclosure may also be used with the second aspect of the disclosure. Some of these features are presented below.

The method of the paragraph above may comprise assessing the kinetic energy error.

The method of the preceding paragraph may comprise assessing the ground speed error corresponding to the difference in the actual ground speed of the aircraft upon completing the turn from the desired ground speed, and obtaining the kinetic energy error from the ground speed error.

The method of the preceding paragraph may comprise calculating the kinetic energy error by solving $\Delta E_T \approx m v_{GSf} \Delta v_{GS}$, where $\Delta E_T$ is the kinetic energy error, m is representative of the mass of the aircraft, $V_{GSf}$ is the desired ground speed of the aircraft at the end of the turn and $\Delta V_{Gs}$ is the ground speed error.

The method of the preceding paragraph may comprise calculating the change in the aerodynamic flight path angle by solving $$\Delta\gamma = \frac{v_{GSf}\Delta v_{GS}}{g(s_f - s_i)},$$

where $\Delta\gamma$ is the change in aerodynamic flight path angle, $V_{GSf}$ is the desired ground speed of the aircraft at the end of the turn, $\Delta V_{GS}$ is the ground speed error, g is acceleration due to gravity, $s_f$ is the final altitude and $s_i$ is the initial altitude.

The method of the two paragraphs above may comprise calculating the change in the aerodynamic flight path angle by solving $$\Delta\gamma = -v_{GSf}\frac{\Delta w_x(\cos\chi_f - \cos\chi_i) + \Delta w_y(\sin\chi_f - \sin\chi_i)}{g|\chi_f - \chi_i|R_c},$$

where $\Delta\gamma$ is the change in aerodynamic flight path angle, $V_{GSf}$ is the desired ground speed of the aircraft at the end of the turn, $\Delta w_x$ is the difference in the predicted wind vector component in the true North-South direction from the actual wind vector component in the true North-South direction, $\Delta w_y$ is the difference in the predicted wind vector component in the true East-West direction from the actual wind vector component in the true East-West direction, $\chi_i$ is the initial true heading, $\chi_f$ is the final true heading, g is acceleration due to gravity, and $R_c$ is the radius of the turn.

The method of any of the six preceding paragraphs may comprise dividing the turn into segments and, for each segment, calculating a change in the aerodynamic flight path angle that will produce a change in the potential energy of the aircraft upon completing the segment substantially to correct a kinetic energy error corresponding to the difference in the actual kinetic energy of the aircraft upon completing the segment from the desired kinetic energy.

The method of the two paragraphs above may comprise determining whether the turn exceeds a threshold, and dividing the turn into segments only if the turn exceeds that threshold. For example, a threshold of 30° may be used. The size of the segments may be determined in many different ways. For example, segments may be created that are equal in size to the threshold value. Alternatively, the turn may be divided into equal segments: optionally, their size is as close as possible to the threshold size without exceeding the threshold size.

From a third aspect, the present disclosure resides in a method of flying a continuous descent approach, comprising flying the continuous descent approach whilst maintaining a pre-determined aerodynamic flight path angle. For an anticipated turn, a correction is calculated to the pre-determined aerodynamic flight path angle as described in any of the paragraphs above. The turn is then made while maintaining the corrected aerodynamic flight path angle during the turn. Upon completing the turn, the remainder of the continuous descent approach may be flown while maintaining the predetermined aerodynamic flight path angle (i.e. without the correction).

The present disclosure also extends to a computer programmed to implement any of the above methods, to a computer program that when executed on a computer causes the computer to implement any of the above methods, and to a computer readable medium carrying such a computer program. The computer may be provided in an aircraft or elsewhere (for example, as part of an traffic control facility).

When forming part of an aircraft, the computer may be part of an aircraft navigation system. This aircraft navigation system may be operable to guide the aircraft during flight. The aircraft navigation system may be operable to guide the aircraft in at least two different ways. The aircraft navigation system, for instance, may provide cues to the pilot such that when the pilot controls the aircraft in accordance with these cues, a constant aerodynamic flight path angle is flown. Alternatively, the aircraft navigation system may be part of an autopilot or may provide information to an autopilot such that the autopilot flies the continuous descent approach flight plan.

When forming part of an air traffic control facility, the computer may be used to generate flight plans for aircraft flying into an airport. For example, the air traffic control facility may provide details to the aircraft, including the flight path angle to be followed during straight parts of the continuous descent approach, corrected aerodynamic flight path angles to be followed during turns, and ground speeds to be targeted (e.g. at the top of descent).

The present disclosure also extends to an aircraft arranged to implement any of the above methods.

Other optional features of the above methods are defined in the appended claims.

BRIEF DESCRIPTION OF THE DRAWINGS

In order that the present disclosure may be more readily understood, preferred embodiments will now be described, by way of example only, with reference to the accompanying drawings in which.

DETAILED DESCRIPTION

Figure 1:
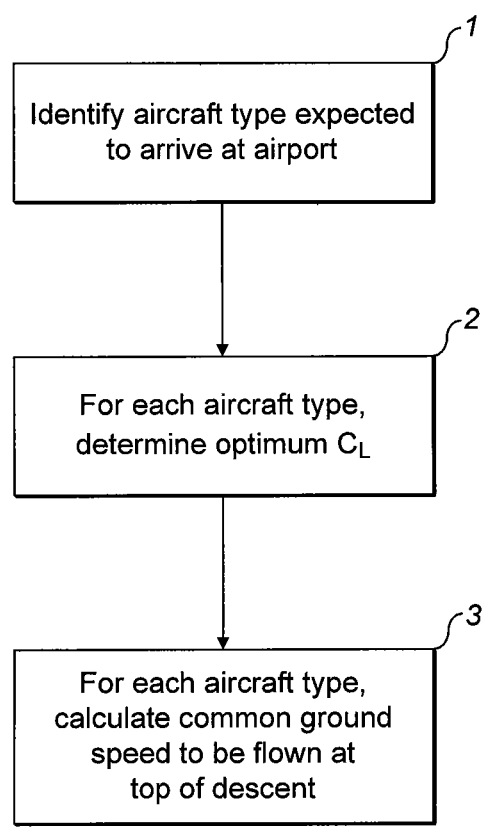
FIG. 1 is a schematic showing the steps followed to calculate a ground speed to be flown at the top of a continuous descent approach.

As noted above, the present disclosure seeks to develop the methods described in EP07380053.4. In that patent application, it is proposed to fly continuous descent approaches by controlling aircraft to follow a preset aerodynamic flight path angle $\gamma_{TAS}$ that produces the most consistent flight times. As a result, aircraft will remain more evenly spaced. Advantageously, this means that smaller separations may be used between airplanes.

Typically, the actual aerodynamic flight path angle $\gamma_{TAS}$ to be followed will depend upon many factors. One of these factors is the ground speed $V_G$ to be flown at the start of the continuous descent approach, i.e. at the top of descent. This ground speed $V_G^{TOD}$ may be calculated by the airport and provided to incoming aircraft.

The optimum aerodynamic flight path angle $\gamma_{TAS}$ also varies (for any particular aircraft) according to other flight parameters such as wind, wind gradient, aircraft weight and atmospheric conditions such as temperature and pressure. As some of these variables will vary from one continuous descent approach to the next, an optimum angle $\gamma_{TAS}$ may be determined for each continuous descent approach. This may be calculated for any particular aircraft by the airport and then supplied to incoming aircraft, along with the ground speed to be flown at top of descent. As an alternative, the aircraft may calculate an optimum angle $\gamma_{TAS}$ based on the ground speed $V_G^{TOD}$ supplied.

In either case, the optimum angle $\gamma_{TAS}$ may be determined automatically or may be determined manually (e.g. by a pilot consulting data tables). Functions may be provided that relate the aerodynamic flight path angle $\gamma_{TAS}$ to the flight parameters mentioned above. Alternatively, tables of aerodynamic flight path angles $\gamma_{TAS}$ may be provided allowing a look-up for a particular combination of aircraft type, aircraft weight, wind, wind gradient and atmospheric conditions. These functions or tables may be available for use by the aircraft's computers, pilots, airport computers or airport personnel.

The predictability in flight time is not particularly sensitive to changes in $C_L(MP)$, the coefficient of lift for maximum predictability, so the nominal flight path (and thus $\gamma_{TAS}$) can be calculated as described earlier but for a slightly different target coefficient of lift $C_L$. This is convenient since it allows an airport to assign a single ground speed at top of descent to all aircraft making continuous descent approaches to an airport, irrespective of any particular aircraft's type. This will result in most aircraft flying with a coefficient of lift $C_L$ slightly away from their optimum coefficient of lift $C_L(MP)$. However, this small difference means that the aircraft will display broadly similar velocity histories and only a small spread in flight times. This should enhance further airport capacity even if each airplane type flies a different $\gamma_{TAS}$.

FIG. 1 and the following description is one way for airports to calculate a ground speed $V_G^{TOD}$ to be flown at top of descent, as described in EP07380053.4. At 1, the airport identifies the aircraft types expected to fly into the airport. At 2, for any particular type of aircraft, the airport obtains the surface area S of the wing for that aircraft type, the typical weight $W_{TOD}$ of that aircraft type at top of descent and the optimum coefficient of lift $C_L(MP)$. At 3, the airport also determines the current air pressure and temperature at top of descent, thereby allowing the density $\rho_{TOD}$ of the air to be found. From this information, the airport can calculate a target airspeed $V_{TAS}^{TOD}$ for that aircraft type from:

$$V_{TAS}^{TOD} = \sqrt{\frac{2 \cdot W_{TOD}}{\rho_{TOD} \cdot S \cdot C_L(MP)}}$$

This airspeed $V_{TAS}^{TOD}$ is readily converted to ground speed $V_G^{TOD}$ using the wind speed $V_{wind}^{TOD}$ at the top of descent, i.e. $V_G^{TOD} = V_{TAS}^{TOD} - V_{wind}^{TOD}$ Hence, the ground speed $V_G^{TOD}$ for that aircraft type is found that provides the optimum coefficient of lift $C_L(MP)$. This process is repeated for all aircraft types known to use that airport. Different ground speeds may be found for different variants of an aircraft type (e.g. for the Boeing 777-200 and 777-300, or even 777-200, 777-200ER and 777-200LR). Hence, a series of ground speeds are found, comprising a ground speed $V_G^{TOD}$ for each particular aircraft type.

In theory, the ground speed $V_G^{TOD}$ could be supplied to each aircraft that is appropriate for its type. However, in practice, an average ground speed $V_G^{TOD}$ is found that is provided to all aircraft, irrespective of their type. This may be a straight average of the values found for each aircraft type (or variant). The average could be found using weighted contributions to reflect the numbers of any particular aircraft type using that airport. This may be useful as certain airports may have different distributions of aircraft type, e.g. hubs like London Heathrow see relatively more large aircraft like the Boeing 747 whereas regional airports tend to see predominantly smaller aircraft like the Boeing 737.

As mentioned above, knowing the ground speed to be flown at top of descent $V_G^{TOD}$ and the optimum coefficient of lift $C_L(MP)$ for any particular aircraft type allows the aerodynamic flight path angle $\gamma_{TAS}$ to be determined for that aircraft. This determination may be performed by the airport or by the aircraft. The angle $\gamma_{TAS}$ may be found directly or tables of data may be derived that relate ground speed $V_G^{TOD}$ to the other flight parameters for an aircraft type. For example, it is possible to generate tables relating optimum aerodynamic flight path angle $\gamma_{TAS}$ to the flight parameters using simulations (either numerical or as flown in a flight simulator).

Figure 2:
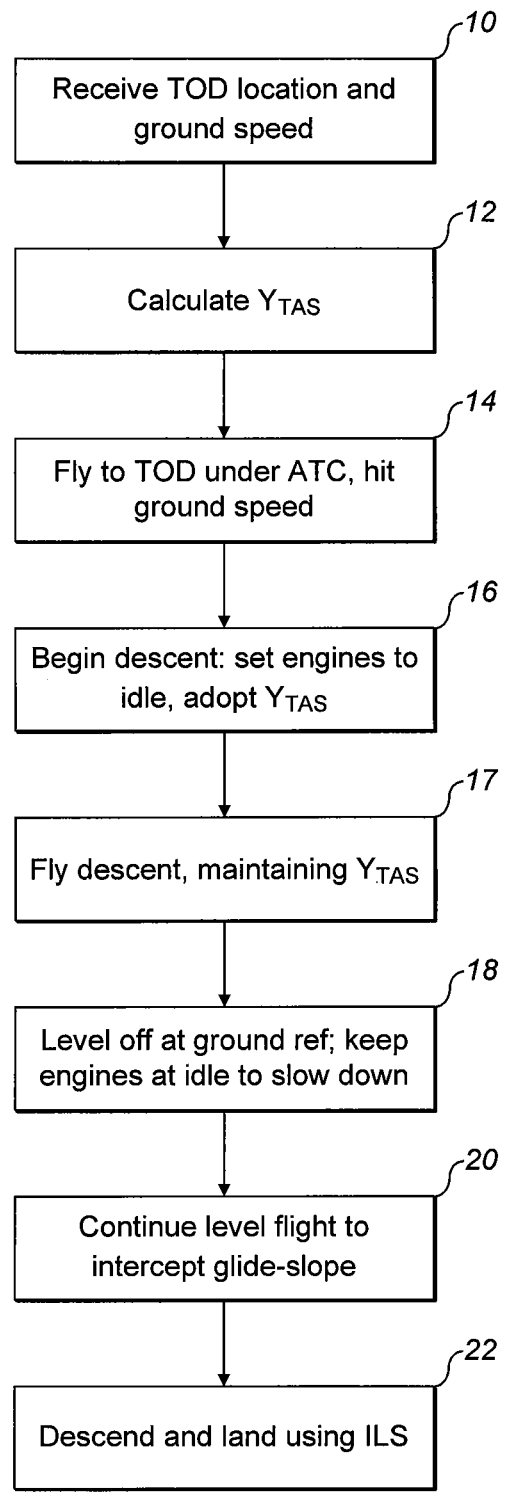
FIG. 2 is a schematic showing the steps that may be followed when flying a continuous descent approach.

FIG. 2 shows schematically the steps that may be taken to fly a continuous descent approach as described in EP07380053.4, i.e. using a control law that maintains a constant aerodynamic flight path angle $\gamma_{TAS}$.

At 10, the aircraft receives a top of descent location from the destination, normally an air traffic controller associated with an airport. The top of descent location will specify a position and an altitude, e.g. 10,000 ft. Alternatively, this information may already be known to the pilot of the aircraft. For example, the pilot may be told on which runway to land such that the pilot may look up a top of descent location associated with that runway, for example from a flight bag.

In addition to receiving the top of descent location at 10, the aircraft also receives from the destination a ground speed to be followed at the top of descent $V_G^{TOD}$. As for the top of descent location, this information may be publicly available such that the pilot may retrieve this information from a flight bag or the like and so the step of sending the ground speed may be omitted.

In this embodiment, the ground speed specified $V_G^{TOD}$ is the same for all aircraft and so ensures similar velocity histories through the descents, thereby allowing separations to be kept to a minimum. The ground speed $V_G^{TOD}$ may be calculated as described above.

At 12, the aerodynamic flight path angle $\gamma_{TAS}$ to be maintained is determined. In this embodiment, this step is performed at the aircraft rather than being performed at the airport. The determination may be performed by a computer of the aircraft or may be determined by the pilot. For example, the value of $\gamma_{TAS}$ is determined from a look-up table that relates $\gamma_{TAS}$ to aircraft weight, ground speed $V_G^{TOD}$, wind gradient and atmospheric conditions for that aircraft type.

Aircraft weight (determined for the top of descent), average wind gradient and atmospheric conditions are typically available to the pilot. Preferably, however, the local wind gradient and atmospheric conditions are relayed to the aircraft at step 10, along with the ground speed.

At 14, the aircraft proceeds to the top of descent location, as prompted by air traffic control (ATC). This leg may be flown manually or using an autopilot. Either way, the aircraft is brought to the specified ground speed $V_G^{TOD}$.

At 16, the top of descent location is reached and the continuous descent approach started. The aircraft's engines are set to idle or near idle with the aircraft in a clean configuration. The aircraft pitches down to adopt the calculated aerodynamic flight path angle $\gamma_{TAS}$. This segment is most likely to be flown under the control of the aircraft's autopilot that will use the aircraft's control surfaces to maintain the constant flight path angle $\gamma_{TAS}$ relative to the changing winds around the aircraft. The ability to control an aircraft using an autopilot is well known and will not be described further here. Alternatively, the segment may be flown manually although it is envisaged that the aircraft will provide cues to the pilot to enable the aerodynamic flight path angle $\gamma_{TAS}$ to be maintained.

The aircraft follows the continuous descent approach until, at 18, it reaches a reference point. Here, the aircraft levels off at whatever altitude it has reached. The intended altitude may be 2,000 ft, although different aircraft types and variations in the actual flight conditions through the first segment of the descent will mean that aircraft will arrive with a spread of altitudes around this desired value. The continuous descent approaches can be calculated to ensure that the spread in altitudes does not compromise safety.

The aircraft levels off at 18 with the engines still set to idle or near idle such that the aircraft slows down to meet the appropriate glide-slope speed for that aircraft. Flaps are deployed as soon as possible as the airspeed decreases to ensure that this segment is kept as short as possible.

Level flight is followed at 20 until the guide-slope is intercepted at 22. At this point the aircraft makes its final approach using ILS to land at its destination.

As will be appreciated, the above description is in relation to flying a straight approach to an airport. As will be appreciated, this happens rarely. Most standard terminal arrivals (and other approaches) require turns to be made during the approach. These turns may be made while observing the above method. For example, step 16 sees the engines set to idle and the aerodynamic flight path angle $\gamma_{TAS}$ adopted for the descent phase: turns may be made during this descent phase while still maintaining the aerodynamic flight path angle $\gamma_{TAS}$.

However, it has been realised that such a method will lead to inaccuracies in the time of arrival. These inaccuracies are caused by a drift in the ground speed histories of the aircraft flying the approaches, due to inaccuracies in the predicted wind speed vector acting on the aircraft during turns. The uncertainty in arrival time may amount to several seconds or more in a typical continuous descent approach.

The reason for the increased time uncertainty is that a local error in the predicted wind vector during the turns may cause a substantial deviation in ground speed with respect to the expected case. The ground speed deviation arises because the aircraft is turning with respect to the surrounding air mass. The difference of the relative velocity of the air mass with respect to the ground from what was predicted causes an unexpected drift on the aircraft with respect to the ground.

Despite the fact that the aircraft's lateral navigation system may add small corrections to the bank angle so that the aircraft follows the nominal horizontal path during a turn, these corrections do not have a material effect on the speed of the aircraft with respect to the surrounding air mass. This is because the magnitude of the wind prediction error may be typically of the order of 1% of the aircraft speed, such that only very small corrections are required to the heading and bank angle to follow the nominal horizontal path. As a consequence of the Galilean invariance principle, the forces felt by the aircraft essentially do not change due to the constant unpredicted wind drift, and so it is expected that the relative changes of speed relative to the surrounding air mass during the turn are very similar to those in the predicted case.

The ground speed at the beginning of a turn may be expressed as:

$$v_{GSi} \approx v_{TASi} - (w_x)_i \cos \chi_i - (w_y)_i \sin \chi_i$$

assuming the wind error to be small compared to the aircraft ground speed, and where
$V_{GSi}$ is the initial ground speed
$V_{TASi}$ is the initial true air speed
$w_x$ is the true (as opposed to magnetic) wind speed component in the North-South direction (positive when blowing from North)
$w_y$ is the true wind speed component in the East-West direction (positive when blowing from East)
$\chi_i$ is the initial true heading of the plane.

The ground speed at the end of the turn is given by $$v_{GSf} \approx v_{TASf} - (w_x)_f \cos \chi_f - (w_y)_f \sin \chi_f$$

where the symbols are as above, with the f subscript denoting the final values rather than initial values. Subtracting the above equations gives $$[v_{GS} \approx v_{TAS} - w_x \cos \chi - w_y \sin \chi]_i^f$$

Applying this equation to the predicted and actual turns, and subtracting both equations gives $$\Delta[v_{GS}]_i^f \approx \Delta[v_{TAS}]_i^f - \Delta w_x [\cos \chi]_i^f + \Delta w_y [\sin \chi]_i^f$$

where $\Delta$ denotes the difference between the predicted and actual case. As noted above, the difference between the true air speed and the predicted air speed should be practically zero, simplifying the above equation to $$\Delta[v_{GS}]_i^f \approx -\Delta w_x [\cos \chi]_i^f + \Delta w_y [\sin \chi]_i^f$$

Hence, a variation in the ground speed must result if there is a constant variation in a wind vector component from the expected case. In contrast to spatio-temporal variations in wind, this effect cannot be felt by an aircraft's airspeed sensors as the actual airspeed history is very similar to the expected one.

This otherwise inevitable drift in ground speed is corrected by applying a change to the aerodynamic flight path angle to be maintained during the turn. This correction is calculated as follows.

The initial wind vector error may be estimated at the beginning of a turn using navigation and air data measurements. Assuming the wind vector error is constant during the turn and equal to that measured at the start of the turn, then the ground speed error may be expressed as $$\Delta v_{GS} = -\Delta w_x (\cos \chi_f - \cos \chi_i) - \Delta w_y (\sin \chi_f - \sin \chi_i)$$

This ground speed error at the end of the turn equates to a kinetic energy error of $$\Delta E_T \approx m v_{GSf} \Delta v_{GS}$$

where the ground speed error is assumed small compared to the total ground speed, and where m is the mass of the aircraft and $v_{GSf}$ is the nominal ground speed at the end of the turn. As described above, this error in kinetic energy is removed by using a compensatory change in potential energy effected by adjusting the aerodynamic flight path angle. Thus, $$\Delta E_V = mg\Delta h = mg\Delta\gamma(s_f - s_i) \approx \Delta E_T = mv_{GS}\Delta v_{GS}$$

where $s_i$ and $s_f$ are the initial and final altitudes of the aircraft. The necessary correction to the aerodynamic flight path angle may be derived from the above equation, namely that $$\Delta\gamma = \frac{v_{GSf}\Delta v_{GS}}{g(s_f - s_i)} = -v_{GSf}\frac{\Delta w_x(\cos\chi_f - \cos\chi_i) + \Delta w_y(\sin\chi_f - \sin\chi_i)}{g|\chi_f - \chi_i|R_c}$$

where $R_c$ is the radius of the turn.

Consequently, the correction of the aerodynamic flight path angle may be found from:
  (i) the nominal ground speed required at the end of the turn;
  (ii) the difference between the expected wind vector true components in the North-South and East-West directions and the actual wind vector true components in the respective North-South and East-West directions (as determined by the navigation systems of the airplane);
  (iii) the initial and final true headings; and
  (iv) the radius of the turn.

In fact, it has been found that the assumption used above that wind vector error remains constant during a turn starts to break down for longer turns. As this causes inaccuracies to creep into the arrival time, longer turns may be broken down into segments, with a correction to the aerodynamic flight path angle calculated and applied for each segment. For example, if a turn exceeds 30°, the turn may be divided into segments all of which are less than 30°. The segments may be equal. Alternatively, segments of 30° may be used where possible. For example, a turn of 100° may be divided into four segments of 25° or may be divided into three segments of 30° followed by a final 10° segment.

Figure 3:
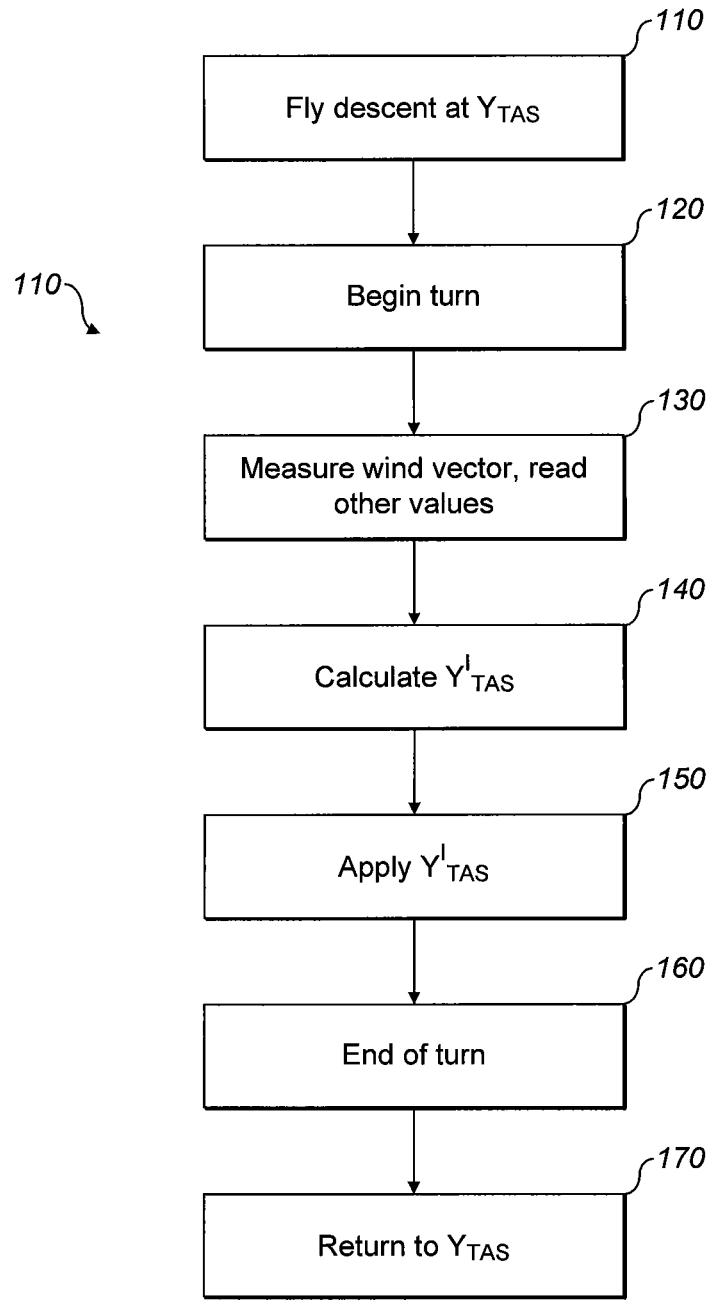
FIG. 3 is a schematic showing the steps followed when making a turn when flying a continuous descent approach according to a first embodiment of the present disclosure.
Figure 4:
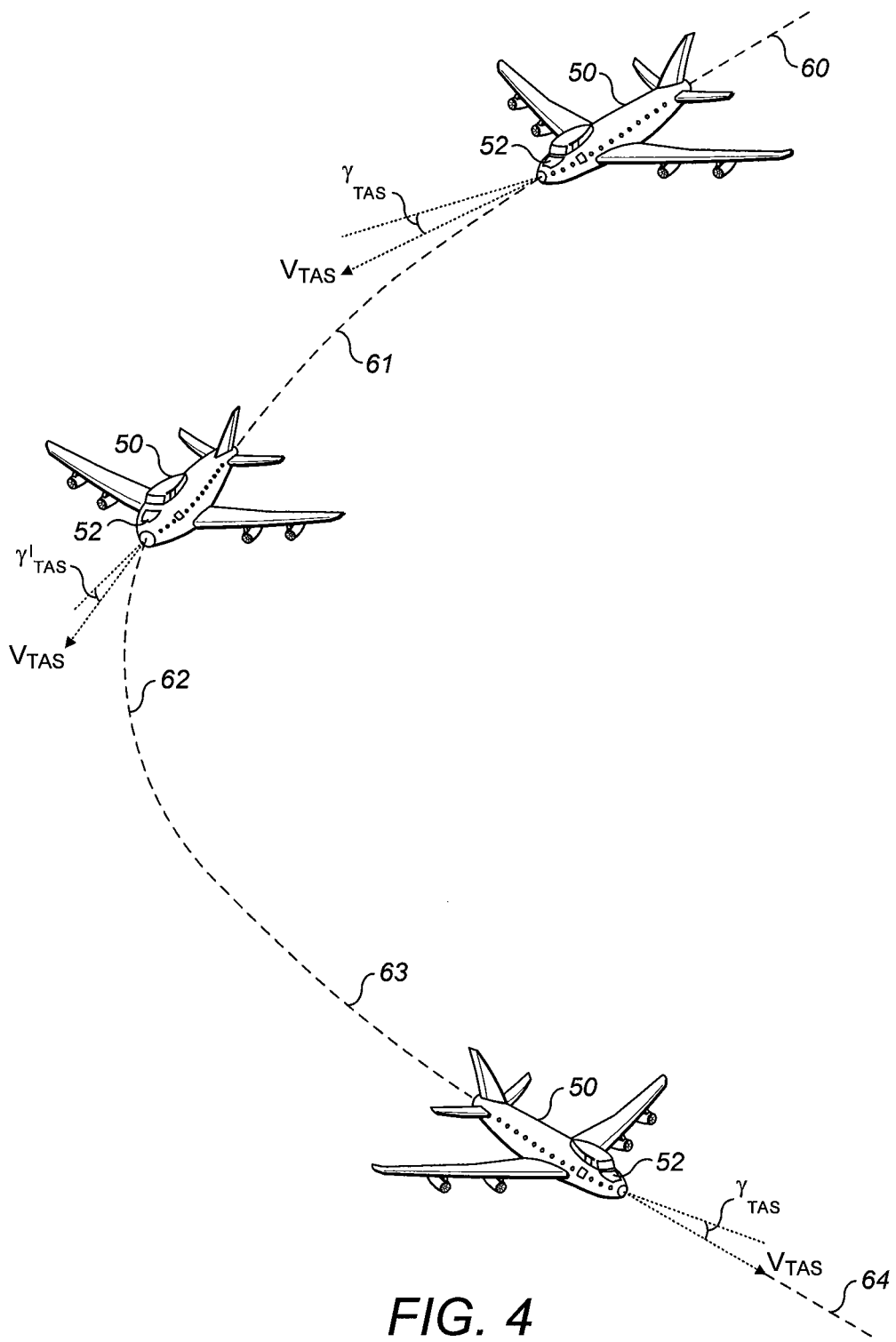
FIG. 4 is a representation of an aircraft making a turn while flying a continuous descent approach according to the first embodiment of the present disclosure.

FIG. 3 shows a method 100 of making a turn while flying a continuous descent at a predetermined aerodynamic flight path angle $\gamma_{TAS}$. For example, the method shown in FIG. 3 may be used in conjunction with the method shown in and described with respect to FIG. 2. The method 100 may be performed during step 17, i.e. while flying the continuous descent approach. FIG. 4 shows schematically an aircraft 50 making a turn during a continuous descent approach while following the method shown in FIG. 3. The track followed by the aircraft 50 is shown at 60, 61, 62, 63 and 64.

A computer provided on an aircraft, and shown schematically at 52, may perform the method of FIG. 3. The method starts at 110 where the aircraft 50 is flying the continuous descent approach along a straight section of track 60 while maintaining an aerodynamic flight path angle $\gamma_{TAS}$. This aerodynamic flight path angle $\gamma_{TAS}$ is maintained for all straight sections of the aircraft's track. This may be in accordance with the method described in EP07380053.4. Thus, the aircraft 50 may be following a designated ground speed provided for the top of descent.

At 61, a turn is begun as indicated by step 120 in FIG. 3. This turn may be as required to follow a STAR (standard terminal arrival), or as a part of a flight plan. As soon as the turn begins at 120, the method proceeds to step 130 where the wind vector is measured and other parameters are read. The wind vector is determined by the navigation system of the airplane 50. The parameters read are the nominal ground speed required at the end of the turn, the expected wind vector components, the initial and final true headings, and the radius of the turn. These parameters may be stored in memory accessible to the computer. The parameters may be input by a pilot or similar and/or may be sent to the memory (e.g. by a datalink from an air traffic control facility).

At step 140, a corrected aerodynamic flight path angle $\gamma'_{TAS}$ to be maintained during the turn is calculated, as follows. First, the wind vector components are calculated from the measured wind vector. The difference between the expected and actual wind vector components are then calculated, i.e. $\Delta w_x$ and $\Delta w_y$. With $\Delta w_x$ and $\Delta w_y$ determined, the computer 52 can solve the equation $$\Delta\gamma = -v_{GSf}\frac{\Delta w_x(\cos\chi_f - \cos\chi_i) + \Delta w_y(\sin\chi_f - \sin\chi_i)}{g|\chi_f - \chi_i|R_c}$$

that was derived above, and hence calculate the required correction to the aerodynamic flight path angle and the resulting corrected flight path angle $\gamma'_{TAS}$, i.e.

$$\gamma'_{TAS} = \gamma_{TAS} + \Delta\gamma$$

At step 150, the aircraft 50 is made to adopt the corrected aerodynamic flight path angle $\gamma'_{TAS}$. This may be achieved using the autopilot directly, i.e. the computer 52 commands a change in control surfaces of the aircraft (e.g. the elevator) such that the aircraft 50 adopts the corrected aerodynamic flight path angle $\gamma'_{TAS}$. Alternatively, the computer 52 may provide prompts to a pilot flying the aircraft 50, e.g. by providing a director bar on the artificial horizon for the pilot to follow. Other methods of effecting the required change in aerodynamic flight path angle will be evident to those skilled in the art.

It will be appreciated that modern computers are capable of the above calculations extremely quickly and so the delay between the turn commencing at 120 and the corrected aerodynamic flight path angle $\gamma'_{TAS}$ being applied at 150 may be a fraction of a second. In fact, the response of the aircraft 50 to both the roll and pitch commands is likely to be much slower. Thus, a roll command issuing may trigger the method at 120 such that step 150 is arrived at whilst the aircraft 50 is in its early stages of responding to the roll command. Thus, the roll and pitch commands may appear to be executed essentially simultaneously.

The aircraft 50 then makes the turn to follow the desired track 62 while maintaining the corrected aerodynamic flight path angle $\gamma_{TAS}$ as shown in FIG. 4.

The end of the turn is reached at 63, and as shown at step 160 in FIG. 3. The aircraft's wings level out and the aircraft 50 once more adopts the original aerodynamic flight path angle $\gamma_{TAS}$ at step 170 and as shown in FIG. 4. This change in aerodynamic flight path angle may be achieved as has just been described.

The aircraft 50 then follows the next straight section of track 64 whilst maintaining the original aerodynamic flight path angle $\gamma_{TAS}$.

The method may be repeated as many times as necessary during the continuous descent approach, i.e. each time the aircraft makes a turn.

Figure 5:
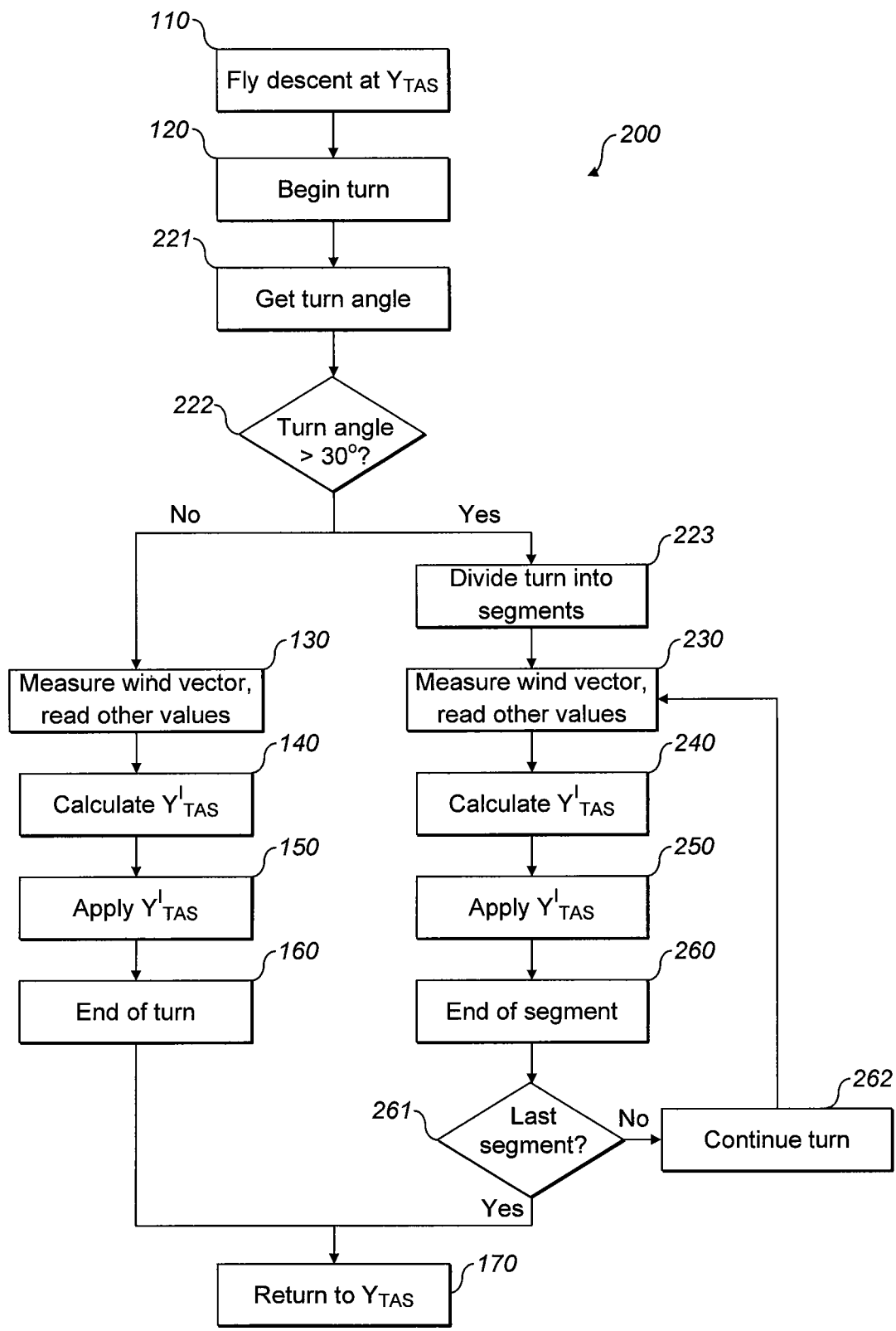
FIG. 5 is a schematic showing the steps followed when making a turn when flying a continuous descent approach according to a second embodiment of the present disclosure.

As mentioned above, it is advantageous to recalculate the correction to the aerodynamic flight path angle when making longer turns. A way of implementing this is shown in FIG. 5. As will be seen, FIG. 5 is similar to FIG. 3 and so the following description focuses on the differences.

FIG. 5 shows a method 200 of making a turn while flying a continuous descent approach, akin to that of FIG. 3 indicated at 100. The method begins at 110 where the descent is being flown while maintaining an aerodynamic flight path angle $\gamma_{TAS}$. The aircraft begins to make a turn at 120.

At 221, the computer retrieves or calculates the turn angle, i.e. the angle through which the lateral part of the aircraft will change during the turn. At 221, the computer makes a determination as to whether the turn angle will exceed 30°. If it does not, the turn may be made as a single segment and so the method continues essentially as described with respect to FIG. 3, i.e. through steps 130, 140, 150, 160 and 170.

However, should step 222 result in the computer determining that the turn angle is greater than 30°, the computer will divide the turn into segments. In this embodiment, this is achieved by dividing the turn angle into 30° segments with a final smaller segment. For example, a 75° turn is divided into two 30° segments and a 15° segment. Alternatively, the turn angle may be divided into equal segments with each segment being chosen to be as large as possible to 30° without exceeding that value. For example, a turn angle of 84° may be divided into three 28° segments.

The method then proceeds to step 230 where the wind vector is measured and the other values are read, akin to step 130. At 240, the corrected aerodynamic flight path angle $\gamma'_{TAS}$ is calculated and then applied at 250, akin to steps 140 and 150 respectively. When the segment ends, i.e. the aircraft completes the turn angle of the current segment, the method proceeds to step 261 where the computer determines whether or not it is the last segment in the turn. If it is the last segment, the method continues to step 170 as will be described below.

If step 261 determines that it is not the last segment, the method proceeds to step 262 such that the turn is continued. The method returns to step 230 where the wind vector is read once more. The other values may or may not be read once more (the other values used in the previous iteration may be used). The method then repeats through steps 240 and 250 such that the newly measured wind vector is used to update the corrected aerodynamic flight path angle $\gamma'_{TAS}$ and the aircraft is controlled to fly to this updated corrected aerodynamic flight path angle $\gamma'_{TAS}$. As the second segment ends at 260, the assessment at 261 as to whether it is the last segment is made again: in this way, the method loops through each segment as described until the last segment is completed. Then, the method continues via 261 to step 170 where the turn is completed by the aircraft rolling out and returning to the original aerodynamic flight path angle $\gamma_{TAS}$.

As before, this method may be repeated each time the aircraft makes a turn during the continuous descent approach.

It will be clear to the skilled person that variations may be made to the above embodiments without necessarily departing from the scope of the invention that is defined by the appended claims.

The invention claimed is:

1. A method of flying a continuous descent approach, comprising:
calculating, by a computer, a correction to an aerodynamic flight path angle of an aircraft when flying the continuous descent approach planned to maintain the aerodynamic flight path angle and to follow a desired ground speed history, the correction to the aerodynamic flight path angle compensating for drift in an actual ground speed from the desired ground speed history when making a turn, changing a geographic heading of the aircraft, during the continuous descent approach, and calculating a change in the aerodynamic flight path angle that will produce a change in potential energy of the aircraft upon completing the turn to correct a kinetic energy error corresponding to a difference in between an actual kinetic energy and a desired kinetic energy of the aircraft upon completing the turn.

2. The method of claim 1, comprising calculating the change in the aerodynamic flight path angle by solving $$\Delta\gamma = -v_{GSf}\frac{\Delta w_x(\cos\chi_f - \cos\chi_i) + \Delta w_y(\sin\chi_f - \sin\chi_i)}{g|\chi_f - \chi_i|R_c},$$

where $\Delta\gamma$ is the change in aerodynamic flight path angle, $V_{GSf}$ is the desired ground speed of the aircraft at an end of the turn, $\Delta w_x$ is a difference in a predicted wind vector true component in a North-South direction from an actual wind vector component in a true North-South direction, $\Delta w_y$ is a difference in a predicted wind vector component in a true East-West direction from an actual wind vector component in the true East-West direction, $\chi_i$ is an initial true heading, $\chi_f$ is a final true heading, g is acceleration due to gravity, and $R_c$ is a radius of the turn.

3. The method of claim 1, comprising dividing the turn into segments and, for each segment, calculating a change in the aerodynamic flight path angle that will produce a change in the potential energy of the aircraft upon completing the segment to correct the kinetic energy error corresponding to the difference in the actual kinetic energy of the aircraft upon completing the segment from the desired kinetic energy.

4. A method of flying a continuous descent approach in an aircraft, comprising: flying the continuous descent approach whilst maintaining a pre-determined aerodynamic flight path angle, calculating, by a computer, a correction to the pre-determined aerodynamic flight path angle according to any preceding claim for an anticipated turn, changing a geographic heading of the aircraft, and making the turn maintaining a corrected aerodynamic flight path angle during the turn.

5. A method of flying a continuous descent approach in an aircraft, the continuous descent approach including a turn, the method comprising:
   (a) adopting a predetermined aerodynamic flight path angle by the aircraft at a start of the continuous descent approach;
   (b) flying the continuous descent approach while maintaining the predetermined aerodynamic flight path angle;
   (c) calculating, by a computer, a correction to the predetermined aerodynamic flight path angle to compensate for drift in an actual ground speed from a desired ground speed history when making the turn; and
   (d) making the turn, changing a geographic heading of the aircraft, while maintaining a corrected aerodynamic flight path angle;
   (e) wherein the correction to the predetermined aerodynamic flight path angle compensates for drift in actual ground speed from a desired ground speed history when making the turn, and is calculated to produce a change in the potential energy of the aircraft upon completing the turn to correct a kinetic energy error corresponding to a difference in an actual kinetic energy of the aircraft upon completing the turn from a desired kinetic energy.

6. The method of claim 5, comprising adopting a predetermined ground speed at the start of the continuous descent approach.

7. The method of claim 5, comprising assessing the kinetic energy error when calculating the correction to the predetermined aerodynamic flight path angle.

8. The method of claim 7, comprising assessing a ground speed error corresponding to a difference in an actual ground speed of the aircraft upon completing the turn from a desired ground speed, and obtaining the kinetic energy error from the ground speed error.

9. The method of claim 8, comprising calculating the kinetic energy error by solving $\Delta E_T \approx m v_{GS} \Delta v_{GS}$, where $\Delta E_T$ is the kinetic energy error, m is representative of a mass of the aircraft, $V_{GSf}$ is the desired ground speed of the aircraft at an end of the turn and $\Delta V_{GS}$ is the ground speed error.

10. The method of claim 9, comprising calculating a change in the aerodynamic flight path angle by solving $$\Delta \gamma = \frac{v_{GSf} \Delta v_{GS}}{g(s_f - s_i)},$$

where $\Delta \gamma$ is the change in aerodynamic flight path angle, $V_{GSf}$ is the desired ground speed of the aircraft at the end of the turn, $\Delta V_{GS}$ is the ground speed error, g is acceleration due to gravity, $s_f$ is a final altitude and $s_i$ is an initial altitude.

11. The method of claim 9, comprising calculating a change in the aerodynamic flight path angle by solving $$\Delta \gamma = -v_{GSf} \frac{\Delta w_x (\cos \chi_f - \cos \chi_i) + \Delta w_y (\sin \chi_f - \sin \chi_i)}{g |\chi_f - \chi_i| R_c},$$

where $\Delta \gamma$ is the change in aerodynamic flight path angle, $V_{GSf}$ is the desired ground speed of the aircraft at the end of the turn, $\Delta w_x$ is a difference in a predicted wind vector component in a true North-South direction from an actual wind vector component in the true North-South direction, $\Delta w_y$ is a difference in a predicted wind vector component in a true East-West direction from an actual wind vector component in the true East-West direction, $\chi_i$ is an initial true heading, $\chi_f$ is a final true heading, g is acceleration due to gravity, and $R_c$ is a radius of the turn.

12. The method of claim 5, comprising dividing the turn into segments and, for each segment, performing steps (c) and (d), in light of step (e).

13. The method of claim 12, comprising determining whether the turn exceeds a threshold, and dividing the turn into segments only if the turn exceeds the threshold.

14. The method of claim 5, comprising adopting the predetermined aerodynamic flight path angle upon completing the turn and maintaining the predetermined aerodynamic flight path angle while straight flight continues.

15. The method of claim 14, comprising: making one or more further turns during the continuous descent approach, and repeating steps (c) and (d), in light of step (e), for each of the one or more turns.

* * * * *